UNITED STATES PATENT OFFICE.

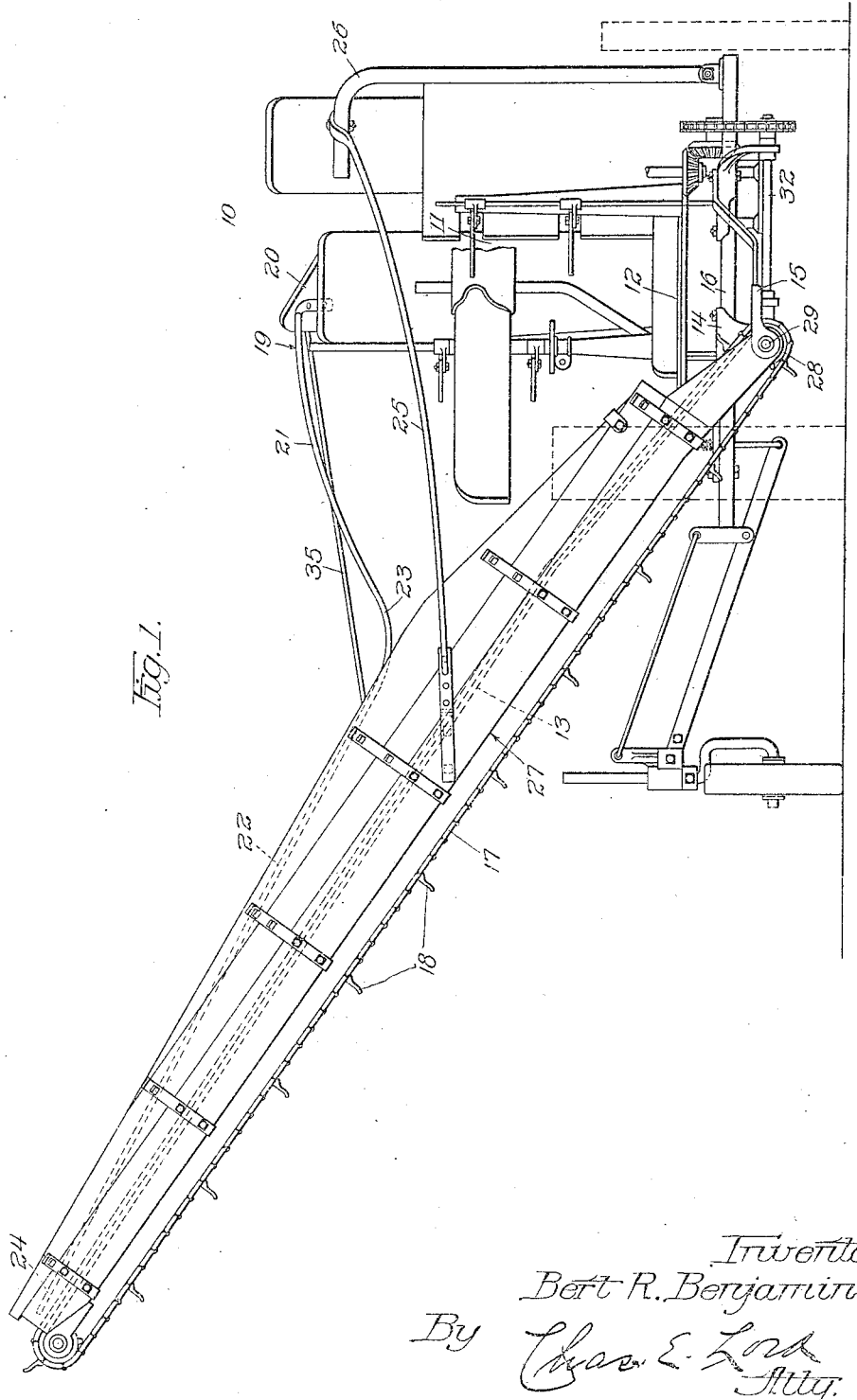

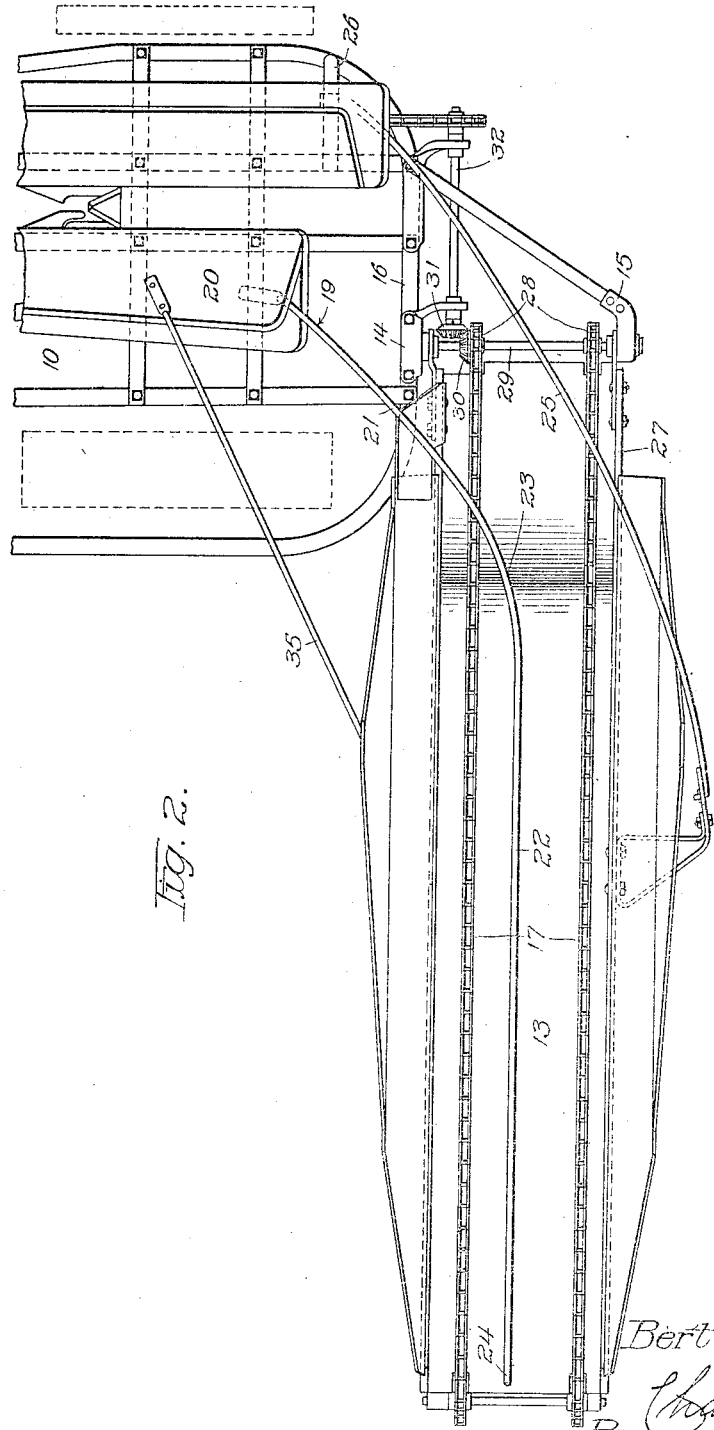

BERT R. BENJAMIN, OF OAK PARK, ILLINOIS, ASSIGNOR, BY MESNE ASSIGNMENTS, TO INTERNATIONAL HARVESTER COMPANY, A CORPORATION OF NEW JERSEY.

ELEVATING MECHANISM FOR HARVESTERS.

1,288,479.      Specification of Letters Patent.      Patented Dec. 24, 1918.

Application filed May 3, 1915. Serial No. 25,540.

*To all whom it may concern:*

Be it known that I, BERT R. BENJAMIN, a citizen of the United States, residing at Oak Park, in the county of Cook and State of Illinois, have invented certain new and useful Improvements in Elevating Mechanism for Harvesters, of which the following is a full, clear, and exact specification.

This invention relates to harvesters, and more particularly to elevating mechanism associated therewith.

In harvesting grain, such as corn, for example, elevating mechanism is used for receiving the bundles from the binding mechanism and conveying such bundles in a manner to drop them into a suitable wagon traveling alongside the harvester. In conveying the bundles upwardly on the elevator, experience has taught that unless suitable means is provided, the bundles will, under some conditions, slide backwardly or be blown off from the elevator under the influence of the wind, the latter objectionable feature being particularly noticeable when the corn is dry.

Therefore, one of the objects of this invention is to prevent anything but a progressive and controllable elevation of bundles of grain from a harvester.

Another object is to render more efficient the elevation of bundles of grain from a harvester to meet the requirements of successful commercial operation.

These and other objects are accomplished by providing an elevator with means for holding the bundles in contact with the conveyer member to cause a progressive and controllable elevation of the bundles.

The invention is illustrated on the accompanying sheets of drawings, in which—

Figure 1 is a rear elevation of a corn harvester embodying my invention, the elevator and holding means being shown in side elevation: and Fig. 2 is a plan view of the arrangement disclosed in Fig. 1.

The various novel features of my invention will be apparent from the following description and drawings, and will be particularly set forth in the appended claims.

I have chosen to illustrate my invention in connection with a corn binder 10, having the usual binding mechanism 11 for binding grain, such as corn, for example, into bundles, the bundles being bound in a vertical position while standing upon the usual butts chute 12. In harvesting grain it is desirable at times to elevate the bundles directly from the binding mechanism of the harvester to a suitable wagon drawn adjacent to the harvester, rather than depositing the bundles on the ground. This has been done by means of an elevator 13 secured to the binder at the rear end thereof in any suitable manner, such, for example, as being secured to bracket members 14 and 15, which are suitably secured to the rear frame member 16 of the binder. Heretofore, in elevating bundles from the binding mechanism of the harvester on the elevator to a point where the bundles can be dropped into a suitable wagon, it has been found that unless some means is provided the bundles have a tendency to, and will under certain conditions, slide rearwardly down the inclined elevator, causing a clogged condition at the lower end of the elevator adjacent the binding mechanism. Also it has been experienced that even though the bundles are conveyed upwardly, the bundles are sometimes blown off from the elevator by a very moderate breeze, this being especially true when the grain is dry. To overcome these undesirable features, I have provided means for holding the bundles against the elevator conveyer chain 17, and particularly in a manner to cause the teeth 18 of the chain or chains 17 to grip the bundles to cause a progressive and controllable elevation of the bundles from the binding mechanism throughout the full length of the elevator.

This holding means takes the form of a resilient member or rod 19, which is secured in any suitable manner to the harvester, in this particular case being secured to the stubbleward gathering board 20 thereof and having a portion 21 extending rearwardly, stubblewardly and downwardly, and another portion 22 extending stubblewardly and upwardly, there being a bent portion 23 between the other two portions of the resilient rod. The portion 21 of the rod approaches the middle portion of the elevator conveyer 17 from a point adjoining the binding mechanism, and the portion 22 gradually approaches the surface of the conveyer 17, on a middle longitudinal line thereof, from the curved portion 23 of the rod to the end 24 thereof, which end 24 lies adjacent the upper portion of the elevator. Due to the fact that the portion 22 of rod 19 gradually approaches the floor of the elevator as it approaches the free end thereof, the pressure exerted upon the bundles gradually increases with the upward movement of such bundles.

The elevator is held in its inclined position by supporting rods 25 and 35, the former of which extends from a suitable frame member 26 of the harvester to the elevator frame portion 27 and assists the portion 21 of the rod 19 in guiding bundles of corn from the binding mechanism to the elevator, the bundles falling prostrate and somewhat transversely over the elevator conveyer 17. The bundles, due to the movement of the conveyer 17, are caused to pass under the bent portion 23 of the rod 19, and from this point the upwardly extending portion 22 of the rod 19 increases its pressure upon the bundles to yieldingly hold, in a positive manner, the bundles in contact with the conveyer member 17, and particularly in contact with the teeth 18 thereof to prevent backward movement of the bundles on the elevator and to prevent the bundles from being blown or otherwise thrown from the elevator, the bundles being properly discharged from the upper end of the elevator into a suitable wagon. It will be noted that the resilient rod 19 extends to the upper limit of the elevator, thereby exerting its holding influence upon the bundles throughout the full length of the elevator.

This rod 19 also serves another function in that it acts as a guide member, burying itself to a certain extent in the bundles, thereby causing the bundles to travel in a path following the upwardly extending portion 22 of the rod 19.

The movable member of the elevator is actuated through suitable sprocket wheels 28, two of which are secured to a shaft 29 mounted in the bracket members 14 and 15, said shaft also being provided with a bevel gear 30 which meshes with another gear 31 mounted upon one end of a shaft 32 which receives its rotary movement from any suitable source of power. When the elevator is being actuated it is apparent that with this combination and arrangement of parts, bundles which are discharged from the binding mechanism 11 and guided to the elevator conveyer by the rod 25 and portion 21 of the rod 19, will be caused to pass under the bent portion 23 of the rod 19, said bundles then in their upward movement being yieldingly held in engagement with the conveyer of the elevator by the bent portion 22 and portion 23 of rod 19 in a manner to insure a progressive and controllable movement of the bundles.

It is evident that there may be various modifications of my invention as herein particularly shown and described, and it is my intention to cover all such modifications which do not involve a departure from the spirit and scope of my invention as set forth in the appended claims.

What I claim as new is:

1. In a harvester, a frame, binding mechanism carried thereby, an elevating conveyer for receiving bundles from said binding mechanism and elevating the same, and a rod secured at one end to said frame and extending over said conveyer for pressing the bundles against said conveyer.

2. In a harvester, a frame, binding mechanism carried thereby, elevating mechanism for receiving bundles from said binding mechanism and elevating the same, and a resilient member secured at one end to said frame and extending longitudinally of the elevating mechanism for holding the bundles thereon, the outer end of said resilient member being free.

3. In a harvester, a frame, binding mechanism carried thereby, elevating mechanism for receiving bundles from said binding mechanism and elevating the same, and means supported by said frame and extending over said elevating mechanism for guiding bundles from the binding mechanism to said elevating mechanism and for pressing said bundles against said elevating mechanism as the said bundles are elevated.

4. In a harvester having a supporting frame, binding mechanism carried thereby, elevating mechanism for receiving bundles from said binding mechanism and elevating the same, and a resilient member fixed at one end to said supporting frame and extending over said elevating mechanism for holding bundles in engagement therewith.

5. In a harvester, a frame, binding mechanism carried thereby, a conveyer for receiving bundles from said binding mechanism and elevating them, and a resilient rod secured at one end to said frame and having one portion for guiding the bundles from said binding mechanism to said conveyer, and another portion extending above said conveyer for holding bundles in engagement therewith to prevent slippage of the bundle thereon.

In testimony whereof I affix my signature.

BERT R. BENJAMIN.

Copies of this patent may be obtained for five cents each, by addressing the "Commissioner of Patents, Washington, D. C."